United States Patent
Bhat et al.

(10) Patent No.: US 7,437,071 B2
(45) Date of Patent: Oct. 14, 2008

(54) DISTRIBUTIVE OPTICAL SWITCHING CONTROL SYSTEM

(75) Inventors: Sudharshan Bhat, San Marino, CA (US); Kirk Evans, Whittier, CA (US); Raffi Garabedian, Monrovia, CA (US); Keith O'Hara, Monrovia, CA (US); Nim Tea, Orange, CA (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 10/102,142

(22) Filed: Mar. 19, 2002

(65) Prior Publication Data

US 2002/0176648 A1 Nov. 28, 2002

(51) Int. Cl.
 *H04B 10/00* (2006.01)
(52) U.S. Cl. .......................................... 398/45; 398/50
(58) Field of Classification Search ............. 398/45–57, 398/140–172
 See application file for complete search history.

(56) References Cited

U.S. PATENT DOCUMENTS 6,625,341 B1 * 9/2003 Novotny ....................... 385/18
6,813,407 B2 * 11/2004 Ramaswami et al. ........... 385/16

* cited by examiner

*Primary Examiner*—Agustin Bello
(74) *Attorney, Agent, or Firm*—Stolowitz Ford Cowger LLP

(57) ABSTRACT

A localized and distributive optical switching control system is separated into three localized systems: a sensor system, a processor system, and a position driver system. The sensor system detects the light transmission efficiency from the input port to the output port, and sends an error signal to the processor system; the processor system processes the error signal and, based upon predefined compensators and control algorithms, generates a control output signal to rectify the error to the sending and/or receiving position driver(s); the position driver(s) receives the control output signal then repositions the sending and/or receiving mirror(s) to the desired position for optimum signal transmission. The amount of communication data and the amount of routing paths between components are reduced, thus decreasing system reaction time and heat generated, allowing controls to be installed on smaller circuits, such as ASIC, and the arrays to be placed closer together.

24 Claims, 5 Drawing Sheets

DISTRIBUTIVE OPTICAL SWITCHING CONTROL SYSTEM

This application makes a claim of priority from co-pending U.S. application Ser. No. 10/102,407 entitled "Position Sensor and Controller For A MEMS Device And Incorporation Thereof Into An Optical Device", filed Mar., 18 2002 in the name of O'Hara Et al, said application being hereby incorporated by reference as if fully set forth herein; co-pending U.S. application Ser. No. 10/036,769, entitled "Moving Coil Motor And Implementations In MEMS Based Optical Switches", filed Nov.8, 2001 in the names of Temesvary et. Al, said application being hereby incorporated by reference as if fully set forth herein; co-pending U.S. application Ser. No. 10/102,602 entitled "Optical Cross-Connect Assembly", filed Mar., 19 2002 in the name of Dueck Et al, said application being hereby incorporated by reference as if fully set forth herein; and co-pending U.S. application Ser. No. 10/102,601 entitled "System And Method For Optimizing Optical Coupling," filed Mar., 19 2002 in the name of Bhat Et al, said application being hereby incorporated by reference as if fully set forth herein; all of which are commonly assigned to Integrated Micromachines, Inc., the assignee of the present invention.

BACKGROUND OF THE INVENTION

1. Field of the Invention

The present invention relates to the control of micro-electro-mechanical systems (MEMS), and particularly to the control of MEMS based optical switching elements, and more particular to the distributive control of MEMS based optical switching mirrors.

2. Background

MEMS includes micro-electro-mechanical devices that are fabricated by "micromachining," which involves carving a device out of a silicon wafer or other materials such as a slide of polymer or quartz or metal, using topography based semiconductor manufacturing techniques (e.g., lithography, deposition, chemical and/or plasma etching, etc. processes.) MEMS based devices find application in many fields. For example, MEMS based optical switches move tiny mirrors to route light signals carrying data from any one of the input fibers to any one of the output fibers without converting the light signals into electrical signals. In a fiber optic network, the tiny mirrors can be positioned to block or pass incoming light beam conveyed via individual strands of optical fiber to receivers (e.g., receiving fibers.) Or alternatively, the mirrors can be pivoted to direct the incoming light beams at a desired angle to receivers.

DESIGN CONSIDERATIONS OF THE PRESENT INVENTION

By way of example and not limitation, the present invention will be discussed in connection with the example of controlling MEMS based optical switching elements and systems, and more particular optical switching systems using MEMS mirrors. The inventive concept includes control of other types of MEMS devices and systems, without departing from the scope and spirit of the present invention.

FIG. 1 shows a schematic diagram of a basic 3-D MEMS optical cross-connect switch circuit. (Reference may be made to the cross-connect assembly disclosed in the concurrently filed, co-pending U.S. Provisional Application No. 60/277, 047, entitled "Optical Cross-Connect Assembly", filed Mar. 18, 2001 in the names of Dueck et. al, which is commonly assigned to Integrated Micromachines, Inc., the assignee of the present invention. This application is fully incorporated by reference herein.)

The light beam signal 100 travels through the fiber optic cable 110, to the input collimating optics, such as a collimator 120, and reflects from the sending mirror 130, to the receiving mirror 140. The light beam signal is then channeled to the output collimating optics, such as a collimator 150, and through to cable 160. In a bi-directional optical switch, the light beam signal can also travel in the reverse direction from cable 160 to cable 110. In that case, the mirrors would reverse their functions: mirror 140 would become the sending mirror and mirror 130 would become the receiving mirror. Likewise, the input collimator 120 would become the output collimator 120, and the output collimator 150 would become the input collimator 150. The cross-connect switch circuit would receive external control signals telling it when to switch and from what input port to what output port.

Because the sending and receiving mirrors must direct the light beams into small-diameter input and output port fiber cores, typically fewer than 9 microns across, tight control of the mirror angles is vital to minimizing the optical power loss incurred from passing through the switch. During operation of the mirror switches, external environmental factors such as thermal instability, system hysteresis and wear may cause the control of the mirror angles to be out of calibration.

By accurately controlling the displacement angles of the mirror, data-carrying light signals can be selectively directed to receivers without the need for repeaters to compensate for losses. One of the inherent problems with prior art MEMS based optical switches is that they require a relatively large amount of electrical power to drive the electromagnets for a relatively small mirror displacement. It is advantageous to have large mirror angular displacement in order to reduce the distance between the sending and the receiving mirrors, and eventually the size of the optical switch. However, greater angular displacement requires more electrical power to generate the necessary force to reposition the mirrors, which usually mean high voltage and/or high current. High voltage may require a robust circuit to handle the higher voltage rating and contributes to signal interferences. High current leads to conduction loss and higher heat build-up in the optical switch system, which adversely affects structural stability as a result of thermal expansion and induced stresses. Further, the problem is compounded when the switch has to switch many signals from a large number of input ports to a large number of output ports.

One of the goals is to have an optical switching mirror system with a maximum angle of reflection of 20° or larger in a 2 or 3 dimensional cross-connect. The optical switch control devices should be compact enough to be installed on a circuit such as an Application Specific Integrated Circuit (ASIC) so as to be scalable by combining mirror arrays to create large numbers of input and output ports with relatively low loss and attenuation throughout the system. The optical switch should also be easily replaceable should there be a failure of mirror(s), extremely reliable, capable of high speed switching to reroute traffic around failures without loss of data, and eventually able to route data traffic packet by packet.

For signal switching applications, it is desirable to have a high degree of precision in terms of signal transfer efficiency so as to reduce losses. Consequently, all of the components have to be optimized to deliver the desired result: the sensor has to be accurate to detect light loss and aiming error since perceived error can be magnified and be over or under compensated at later stages; the controller or processor has to be flexible and robust to process signals from numerous sensors and to generate control output signals to switching mirror position drivers simultaneously under a variety of system parameters; and the position driver has to accurately reposition the mirrors to the desired locations.

The position driver design has to take into considerations the following desired parameters: low internal losses to provide high operating efficiency, leading to small size and low cost equipment; high signal-to-noise ratio to provide quality power to the load; and high surge ratings to protect against overcurrent and overvoltage conditions, thus improving reliability. The challenge is to get enough dynamic range to control the mirrors while variables such as vibration and temperature fluctuate over wide ranges.

Heat Dissipation

Removal of excess thermal energy produced in active devices, which can include switching resistance, diode forward drops, copper losses, and core losses. The system must withstand worst-case internal power dissipation for considerable lengths of time in relationship to the thermal time constants of the heat sinking hardware.

The available cooling methods to remove the thermal generation include natural convection, forced convection, and conduction. If the excess thermal energy is not removed properly, the temperature rise can create circuit failure and/or reduce power delivery efficiency.

Noise

The other problem to be resolved is noise, or interference, which can be defined as undesirable electrical signals that distort or interfere with the original or desired signal. Examples of noise sources include thermal noise due to electron movement within the electrical circuits, electromagnetic interference due to electric and magnetic fluxes, and other transients that are often unpredictable. The main techniques used to reduce noise consist of applying shielding around signal wires using digital signal transmission when appropriate, increasing the distance between the noise source and signal, decreasing the length that the desired signal must travel, rounding off or smoothing rough edges to reduce the effects of corona, and proper grounding of the entire system.

The ratio of the signal voltage to the noise voltage determines the strength of the signal in relation to the noise. This is called signal-to-noise ratio (SNR) and is important in assessing how well power is being delivered. The higher the SNR, the better the delivery of desired power.

Scalability

The problems as listed above are compounded when the size of the optical switch is increased to include a large quantity of input and output ports. The optical switch has to receive signals from numerous sensors, process them, and send control output signals to the appropriate drivers. The complex coordination of monitoring and controlling signals can overload the central processor system, slow down the communication of data or introduce errors between the component systems, and compromise the integrity of the switching network.

SUMMARY OF THE INVENTION

The invention overcomes the difficulties of the problems listed above by separating the MEMS based system (in the example discussed herein, optical switching system) to three localized components with their own distributive control system: the sensor system, the processor system, and the switching mirror position driver system. By not overloading the central processor and reducing the amount of communication data and the distances between the components, the invention reduces conduction losses, increases system reaction time due to localized control, increases signal-to-noise ratio, simplifies the control process because of the compartmentalized approach to the switching process, and allows for scalability and ease of fabrication.

This distributive approach reduces the input and output wiring between the sensor system and the processor system, and between the processor system and the position driver system. The reduction of signals can be as few as one signal between the components: one error signal from the sensor circuit to the processor circuit; and one position setpoint signal from the processor circuit to the position driver circuit. To further decrease the electromagnetic interferences and the heat generation from conduction losses, the signals between the systems can be converted to digital form for ease of transmission.

The distributive control is done at the local levels. The sensor circuit has all the necessary control components, such as compensators and drivers installed in the hardware, to sense the light beam from the input port to the output port and generates an error signal to the processor circuit. The processor circuit can further manipulate the error signal and/or retransmit it to the position driver circuit. The position driver circuit, with its localized control components, receives the error signal and repositions the switching mirror accordingly in order to negate the error.

If the level of control is complicated such that some parts of the distributive control algorithms cannot be done at the sensor level or the position driver level, then the location and amount of the signal processing can be concentrated at the processor level where data can easily be manipulated and compensated. Software control algorithms can be introduced and removed depending upon the specific requirements of fiber optic switching. The flexibility of this distributive control system, where the location and amount of signal processing can vary depending on the situation, can be fully utilized to maximize system response and minimize signal transmission error.

The distributive control system can also be a hybridized system varying between a centralized control system where all processing is done at the processor level, and a totally distributive control system with minimum indication and control signals as mentioned above. The control system can be an open loop system where the error signal is transmitted one way to the position driver, or a closed loop system where the position driver feedbacks its mirror position and functions with the sensor circuit and the processor circuit to decrease the magnitude of the error signal after every control iteration.

The control system and components are localized such that a fatal fault with a mirror-switching array component can easily be accessed and replaced without the need to replace the entire fiber optic switch. Further, localized and distributive control facilitate paralleling processing in the repositioning of the mirrors for optimum signal transfer; improved signal to noise capability due to local shielding and minimal signal degradation over distance; and simplicity to facilitate step-and-repeat fabrication of large ports optical switch system.

The advantages of having compartmentalizing components with local control are simplicity, flexibility and scalability of the system. As a result, the invention allows for more leeway with constricting design parameters and increases the options in the selection of enabling technology in the design of a fiber optic switching circuit. For example, the invention facilitates the use of electromagnetic MEMS control, which has greater torque than that of electrostatic control for controlling the switching mirrors but at a cost of higher level of conduction loss, in an Application Specific Integrated Circuit (ASIC) configuration. The invention compensates for the greater conduction loss of electromagnetic control by reducing the overall thermal generation of the optical switching system. One of the advantages of using electromagnetic MEMS mirror control over electrostatic MEMS mirror control is greater tip and tilt angle displacements. The advantage of using an ASIC configuration is the reduction in size of the optical switch.

Many other MEMS based devices and systems may be equivalently controlled in accordance with the inventive concepts of the present invention, without departing from the scope and spirit of the present invention.

DETAILED DESCRIPTION OF THE PREFERRED EMBODIMENT

Figure 1:
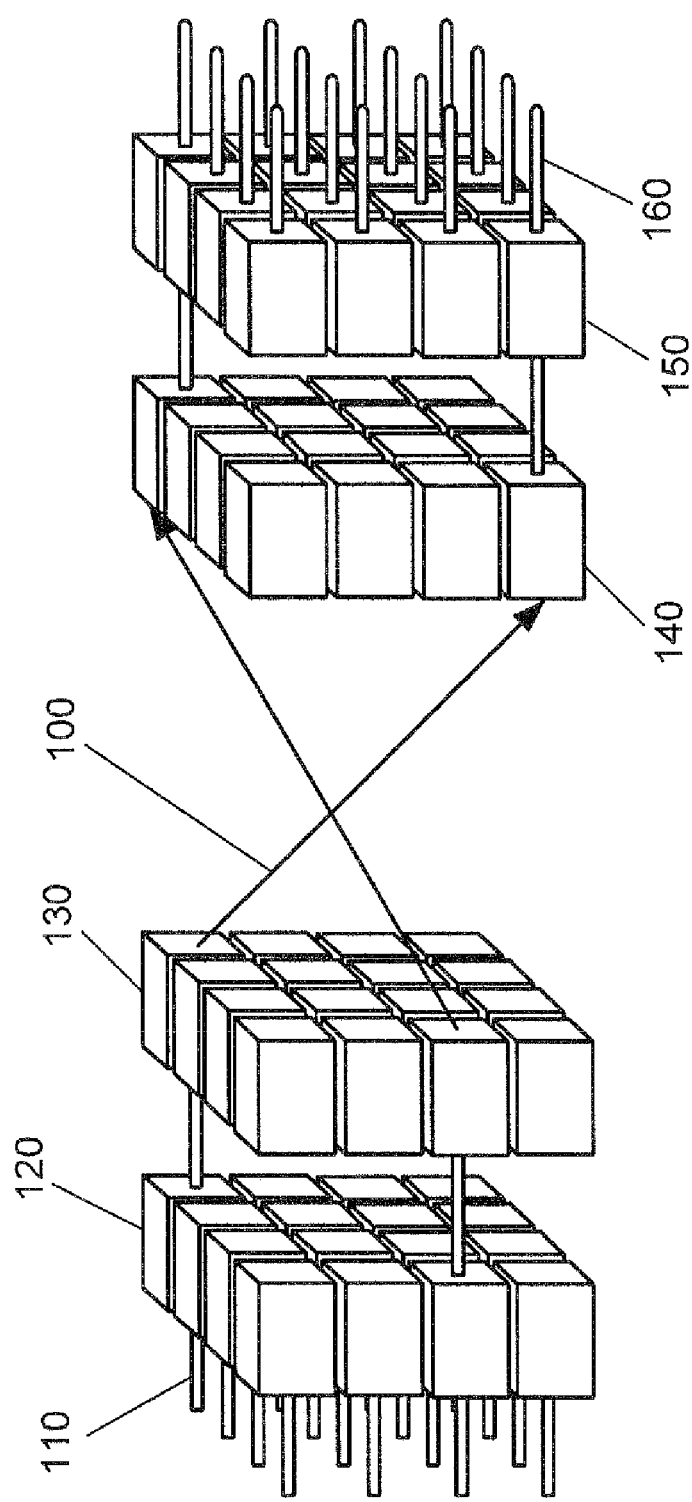
FIG. 1 is a schematic diagram of a basic 3-D MEMS optical cross-connect switching circuit.

This invention is described below in reference to various embodiments and drawings. While this invention is described in terms of the best presently contemplated mode of carrying out the invention, it will be appreciated by those skilled in the art that variations and improvements may be accomplished in view of these teachings without deviating from the scope and spirit of the invention. This description is made for the purpose of illustrating the general principles of the invention and should not be taken in a limiting sense. The scope of the invention is best determined by reference to the appended claims.

The present invention relates to a localized and distributive control system for MEMS based devices, and will be explained in connection with the control of MEMS based optical switching devices and systems for optical network. Other devices and systems may be controlled within the scope of the inventive concepts.

In accordance with one aspect of the present invention, accurate and stable control is achieved by localizing the control devices at the microelectronic level to control the positioning of the sending and/or receiving optical switching mirrors. The invention separates the fiber optic switching system into three localized systems: a sensor system, a processor system, and a position driver system.

Sensor System

The purpose of the sensor system is to measure the light beam at the output port, or both the input and output ports of the fiber optic switch and determine the transmission efficiency. If too much of the light signal is being lost, the sensor circuit transmits this information to the processor system so that the sending and/or the receiving mirrors can be adjusted to optimize the signal transfer across the optical switch. The method to determine the magnitude of the signal error can vary from light diversion to space monitoring.

In the light diversion method, the sensor circuit senses the amount of light into the receiving fiber by diverting a fraction of the light and generating an error signal to a processor circuit. The error signal becomes an input parameter to control the positioning of the sending and receiving mirrors. In the space monitoring method, the area around the light is monitored to determine the direction that the light is traveling away from the optimum path of transmission. This can be done by placing a multiple number of light sensors around the intended path and monitoring the intensity of the light diffraction in order to determine the exact location and intensity of the error.

The method to determine the error value is based on if the light intensity is measured at both the input and output ports, or only at the output port. If the light intensity is measured at both the input and output ports, the error is determined by subtracting the measured light signal at the output port from the measured light signal at the input port. The difference is the signal loss across the optical switch. If the light intensity is measured only at the output port, then the error is determined by subtracting the measured light signal from a predicted signal or a relative signal as measured previously. This process can be an iterative process to control the mirrors, increase the light intensity at the output port, and obtain maximum signal transfer.

The sensor circuit also has an algorithm to manipulate the error signal so that it can have the proper unit, and be processed in the next stage, the processor system. The sensor circuit also has the intelligence to determine if the error signal is within an acceptable range of tolerances and do nothing. If the error is unacceptable, then the fiber optic switching sending and/or receiving mirror(s) are to be repositioned to maximize signal transfer. The tolerances allotted to angle and to position will be different for each port-to-port configuration and can be weighed accordingly by the processor based upon a predetermined set of parameters.

Alternatively the sensor system can be configured to perform minimal amounts of processing if necessary and function only to pass detected states of the sensed optical signal to the possessor system for processing and further manipulation. This approach may be useful in systems or situation where it would be impractical or difficult to place the required amount of compensators, processing elements, and sensing elements within a localized sensing system. A main objective of this present invention however is to distribute such processing and data manipulation tasks throughout a system to allow for greater design flexibility, thusly it is preferred to configure the sensor system as described in the preceding paragraphs, as a fully functioning sensor system able to generate and transmit the control error signal based on sensed data.

The sensor operation is independent of system state. Therefore, numerous sensors monitoring light transmission from input ports to output ports with varying levels of error can send their information directly to the processor circuit. The signals can be processed further by the processor system, or they can be used as direct values to control the sending and/or receiving mirror positioning drivers such that a proportionate change in signal magnitude will bring about a proportionate change in the position of the driver. In this distributive control arrangement, the error magnitude and direction are monitored at the local level to reduce further processing at the processor level.

The control system is based on the fact that the more precise the sensor is in determining the error, the better the is system to compensate for the error. Further, it is desirable to compensate for true signal error rather than the system generated error such as noise with the goal of obtaining high signal-to-noise ratio. In this invention, the noise signal generated by the sensor circuit will be compensated locally so as to prevent the transmission of the noise to the next signal processing stage.

Processor System

The processor circuit receives external switching control signals in order to determine when to switch and which input port is connected to which output port. It also receives the error signal from the sensor circuit and generates a control output signal to reposition the sending and/or receiving mirror(s) in order to maximize signal transmission. The raw error signal from the sensor circuit can be processed at the processor circuit or be retransmitted to the position driver circuit depending upon how the localized control systems are configured.

The processor system can have a calibration algorithm that generates a matrix of setpoints for each unique mirror and each port-to-port option either through 2D or 3D switching. The calibration process can be done periodically or when the error signal surpasses the allowable tolerance. The self-calibration program can have programs to compensate for noise, temperature, humidity, vibration, or any other parameters, which may have an effect on the transfer efficiency.

The bandwidth for this calibration process is between 10-100 Hz, which is enough of a switching time to correct for a dropped channel, or reroute data traffic around a failed switch. The state switching bandwidth of the system processor is approximately 100 Hz multiplies by the number of ports. At 100 Hz×1000 ports, the speed is only 100 KHz, which is much lower than the throughput bandwidth of greater than 100 MHz. When the processing and communication speeds increase, the switch can also switch data packet by packet.

Compensators can be incorporated within the processor circuit. For example, a temperature sensor can be installed to monitor the thermal energy generated inside any of the three circuits. The temperature signal is sent to the processor circuit, whose value can be configured as an offset for the position driver, and/or to alarm or shutdown the switching circuit when the temperature rises above a certain threshold. Likewise, a vibration sensor can also serve in a similar function. These sensors can be utilized on a global basis, meaning that they will affect the control of all of the position drivers similarly.

The control algorithm can use various methods to achieve optimum light transmission. By using a "hill climbing" algorithm or any other optimizing or tuning method, the processor can control how quickly the signal will reach its optimal transmission point on top of the bell-curve hill. The control can vary depending upon the situation and whether how much overshoot or undershoot is tolerable in relationship to time. For optical switching systems as described and discussed in this document, it may be advantageous to utilize the control system optimization method disclosed in the concurrently filed, co-pending U.S. Provisional Application No. 60/277, 046, entitled "System and Method For Optimizing Coupling In A Cross-Connect Switch", filed Mar. 18, 2001 in the names of Bhat et. al, which is commonly assigned to Integrated Micromachines, Inc., the assignee of the present invention. This application is fully incorporated by reference herein.

The signal(s) from the processor can be a variation of many parameters. The processor can tell the driver to move to a certain point, using the x-y-z coordinate system, or to move to a certain direction with a certain magnitude, or to move to a preset programmed position based upon an input. The flexibility of the processor-based system is inherent.

Since the light transmission errors of each pair of sending and receiving mirrors are unrelated or independent; and the input and output signals are minimized in terms of transmission distance and amount of transmission data, the processor can parallel process and generate control signal outputs simultaneously to the position driver circuits. Such parallel processing tasks will be limited by the particular processor used in the system, and by available processor technology. As the switching system is scaled up in terms of port count, and likewise the number of position driver circuits which must be controlled, it may be necessary to distribute processor tasks one step further by employing an electronic (digital or analog) cross connect processing unit to work in conjunction with the top-level processor. The digital cross connect can function to link signals directly from one position driver circuit to another while also sending and receiving commands from the top level processor. This "distribution" of processing tasks to the digital cross connect unit once again illustrates the benefits of the present invention.

Position Driver System

The purpose of the position driver system is to receive a control output drive signal from the processor circuit and reposition the sending and/or the receiving mirror to the desired location in a desired manner. In this invention, the position driver system consists of digital and analog components; a sensor for each mirror to detect the current location of the mirror; a compensator system to suppress unwanted signals such as system harmonics and to compensate for temperature and vibration variations; a controller to process the variables such as a summing function; and a driver to move the mirror to the desired tip and tilt angles. The integrated position driver system can be fabricated on a integrated circuit such as a Application Specific Integrated Circuit (ASIC) next to the mirror circuit in order to reduce the distance the control signals must travel.

In this invention, the signal transmission from the processor system to the position driver system is digital, which the electronic circuit can receive and process. The advantage of a digital rather over analog signal transmission is that the signal is less likely to be affected by system noise and electromagnetic interference. Further, there is no conduction loss, which can generate heat and compromise the thermal integrity of the circuit. This reduction of electromagnetic interference and heat generation allows for position driver systems to be placed closer together thus reducing the physical size of the optical switch.

The mirror sensor measures the tip, tilt, and height of the movable member of the mirror in a three-dimensional position axes in order to determine the exact position of the device. Position sensing may be based on eddy current sensing. It can also be implemented with a variable coupling transformer or a linear variable differential transformer (LVDT). In the case of a LVDT position sensor, a high frequency AC or pulsed signal is sent through the windings of the planar coils. The tilt positions of the movable member are determined based on the detection of the variation in current induced in the position-sensing coils arising from changes in the relative positions between the planar coils and the respective position-sensing coils. In the invention, the mirror sensor is located near the mirror so that the voltage drop of the transformer is minimized and there is less likelihood for electromagnetic interference. As a result, the accuracy of the signal is greatly increased. The position sensor may be designed to be based on the LVDT position sensors disclosed in the concurrently filed, co-pending U.S. Provisional Application No. 60/277,049, entitled "Position Sensor And Controller For A MEMS Device And Incorporation Thereof Into An Optical Device", filed Mar. 18, 2001 in the names of O'Hara et. al, which is commonly assigned to Integrated Micromachines, Inc., the assignee of the present invention. This application is fully incorporated by reference herein.

The compensator compensates for the dynamics of the mechanical mirror and improves performance of dynamic switching. This is required to achieve optimum switching times and provide rejection to external disturbances such as shock. The position driver system can have auxiliary sensors to monitor local environmental conditions such as temperature and vibration, and have compensators to compensate for these parameters. By localizing these sensors to the individualized local position driver, precise control is further increased.

The controller receives the control output signal from the processor system and adjusts the position driver circuit accordingly. It can be as simple as a summer to quantify the magnitude that the driver must reposition the mirror. It can also be sophisticated and have the capability to process "hill climb" algorithm or self calibration in order to precisely control the mirror and reduce error, and thus reduces the processing requirement at the processor system. A feedback system can also be incorporated to determine if the repositioning of the sending and receiving mirrors, which can be done separately or simultaneously, have increased or decreased the error.

The driver is configured to provide quick response to move the mirror from the current position to the desired position. By localizing the controller and control wiring, the invention reduces heat generation, which will result in precise control and increase in energy efficiency. With reduced heat, the invention increases the system to withstand thermal and mechanical stresses, which can increase the capacity of the circuit to deliver more power.

System Integration

The design of the optical switch, incorporating the invention, can be accomplished using varying methods: digital circuit, analog circuit, open loop control system, closed loop control system, etc. The actual design is based on the application. For example, a digital circuit based design can be more complex than an analog based circuit design; however, it is more immune to signal interferences, and has greater flexibility especially in the application using microprocessor, which can receive numerous signals and process them with easily replaceable control algorithms. Analog circuit based design is more application specific and generally easier to fabricate and configure. Where greater accuracy is required, a closed loop control system design is better suited than an open loop control system; however, it will be at the expense of greater circuit complexity. Application and cost are usually the controlling parameters in the design of the appropriate circuit. The distributive control system approach is applicable in all of the aforementioned cases.

Digital Circuit

Figure 2:
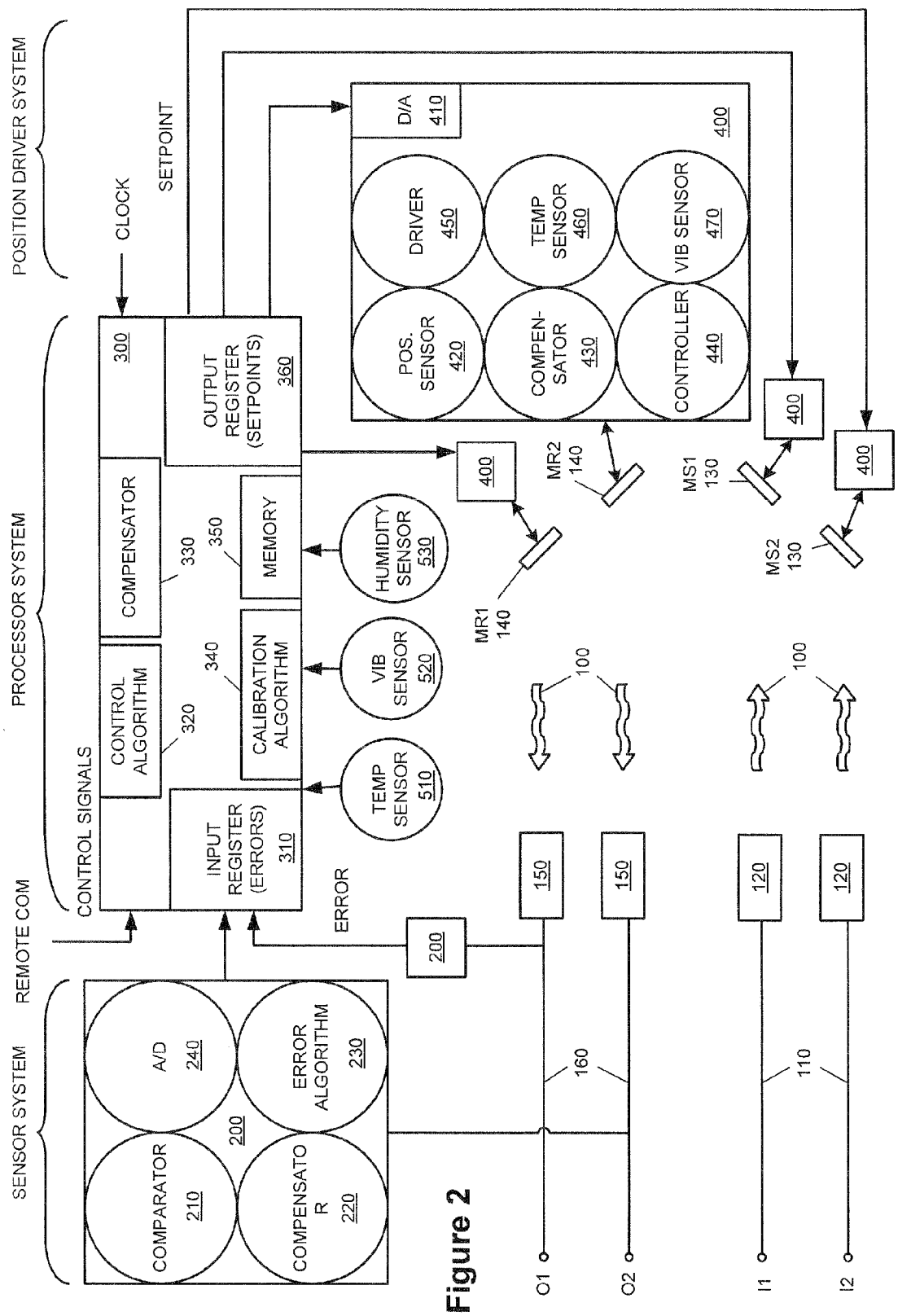
FIG. 2 is a block diagram illustrating one embodiment of the present invention with a microprocessor in an open loop system.

The processor system of the fiber optic switching circuit can be based on a microprocessor or a multi-ports switch. FIG. 2 is a block diagram schematically illustrating an optical cross-connect in accordance with one embodiment of the present invention with a microprocessor in an open loop system. The physical structure and components of the cross-connect assembly may follow the embodiments disclosed in the U.S. Provisional Application to Dueck et al. which had been fully incorporated by reference herein.

Each switch has a mirror that can be driven to pivot, rotate or otherwise move about at least two axes in the plane of the array. The mirror switches may include the structures disclosed in the concurrently filed, co-pending U.S. Provisional Application No. 60/277,135, entitled "Lorentz Motor And Implementations In MEMS-Based Optical Switches", filed Mar. 18, 2001 in the names of Temesvary et. al, which is commonly assigned to Integrated Micromachines, Inc., the assignee of the present invention. This application is fully incorporated by reference herein.

In the schematic diagrams in FIGS. 2-4; the mirrors are represented as $Ms_1$ and $Ms_2$ for mirror motions in two orthogonal axes for the sending mirrors 130 and $Mr_1$ and $Mr_2$ for mirror motions in two orthogonal axes for the receiving mirrors 140 (as discussed below).

In this invention, the data to be transmitted between the components is digital, in order to have minimum signal interferences, and are in one direction: the error signal from the sensor circuit 200 to the processor circuit 300, and the control output setpoint from the processor circuit 300 to the position driver circuit 400.

The light beam signal 100 travels through the fiber optic cable 110, to the input collimator 120, and reflects from the sending mirror 130, to the receiving mirror 140. The light beam signal is then channeled to the output collimator 150, and through to cable 160. In a bi-directional optical switch, the light beam signal can also travel in the reverse direction from cable 160 to cable 110. In that case, the mirrors would reverse their functions: mirror 140 would become the sending mirror and mirror 130 would become the receiving mirror. Likewise, the input collimator 120 would become the output collimator 120, and the output collimator 150 would become the input collimator 150.

The sensor circuit 200 measures the light signal intensity at the output port by the light diversion method. The sensor circuit 200 consists of the comparator 210, the compensator 220, the error algorithm 230, and the analog-to-digital converter 240. The comparator 210 compares the measured signal to a predicted optimum value or a relative value as previously measured. The compensator 220 compensates for internal noise and natural harmonics. The error algorithm 230 calculates the error value based upon predetermined equations. The analog-to-digital 240 converts the analog signal to digital and transmits the error value to the processor circuit 300.

The processor circuit 300 consists of the input register 310, the control algorithm 320, the compensator 330, the calibration algorithm 340, the memory 350, and the output register 360. The processor circuit 300 receives the error signal from the sensor circuit 200 and places it in the input register 310. The control algorithm 320 processes the signal based upon a "hill climbing" algorithm or any other optimizing or tuning method, such as the optimization system and method disclosed in the concurrently filed, co-pending U.S. Provisional Application No. 60/277,046, entitled "System And Method For Optimizing Optical Coupling In A Cross Connect Switch", filed Mar. 18, 2001 in the names of Bhat et. al, which is commonly assigned to Integrated Micromachines, Inc., the assignee of the present invention. This application is fully incorporated by reference herein.

The closed loop compensator 330 compensates for internal noise and natural harmonics. It can also compensate for temperature, vibration, and humidity variations; measured values are obtained from temperature sensor 510, vibration sensor 520, and humidity sensor 530. The calibration algorithm 340 has offsets and a matrix of setpoints for each unique mirror and each port-to-port option. The calibration values are stored in memory 350, which can be changed locally or remotely by downloading new calibration values. The processor circuit 300 generates control output setpoint values, places them in an output register 360, and transmits them digitally to the position driver circuit 400.

The position driver circuit 400 consists of the digital-to-analog converter 410, the position sensor 420, the compensator 430, the controller 440, the driver 450, the temperature sensor 460, and the vibration sensor 470. The position driver circuit 400 receives the control output setpoint from the processor circuit 300. Before repositioning the mirror to the new setpoint, the position sensor 420 determines the switching mirror 140 present location: tip and tilt angles. The driver circuit also monitors its environmental conditions via temperature sensor 460 and the vibration sensor 470, and utilizes the compensator 430 to compensate for temperature and vibration variations. The controller 440 compares the compensated present location of the switching mirror and the control output setpoint from the processor circuit in order to determine how much and in what direction to reposition the switching mirror. This calculated value is sent to the driver 450, which performs the reposition action to obtain maximum signal transfer.

The processor 300 receives control signals from the remote communication line 500, which tell the processor when to switch, and from which input port to what output port. The control signals can include updated control algorithms, calibration data, and other parameters, which may affect the generation of the control output setpoint signals.

Figure 3:
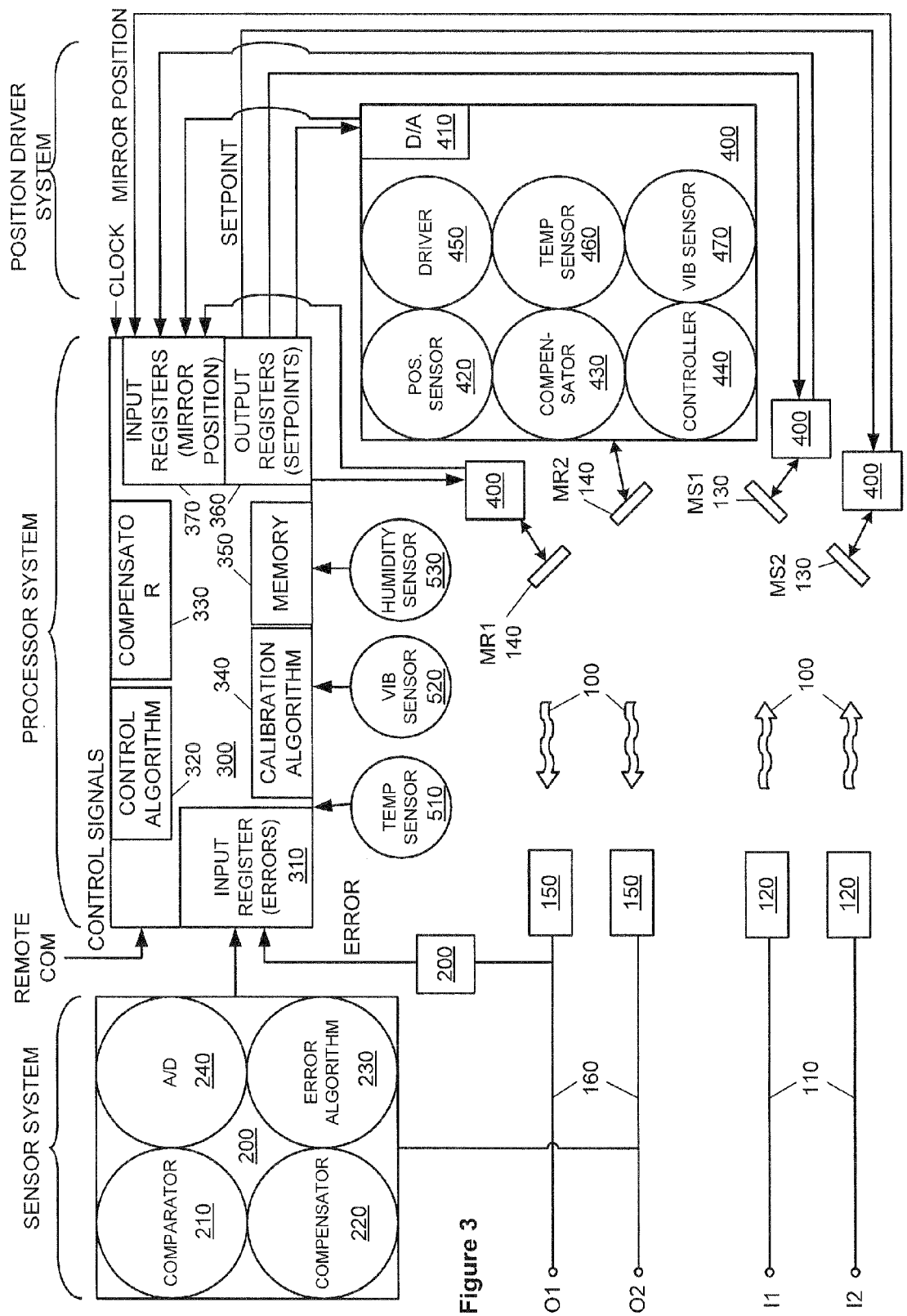
FIG. 3 is a block diagram illustrating another embodiment of the present invention with a microprocessor in a closed loop system.

FIG. 3 is a block diagram showing one embodiment of the present invention with a microprocessor in a closed system. The components and system layout are similar to those in FIG. 2. However, in this embodiment of the invention, the position driver 400 sends a digital signal indicating the switching mirror tip and tilt position to the processor 300 via the input register 370. The control algorithm 320 takes the switching mirror current position into consideration in its calculation of the control output setpoint signal to be sent to the position driver 400. This is a closed loop control system, which will yield more accuracy after every control iteration than the open loop control circuit.

Analog Circuit

Figure 4:
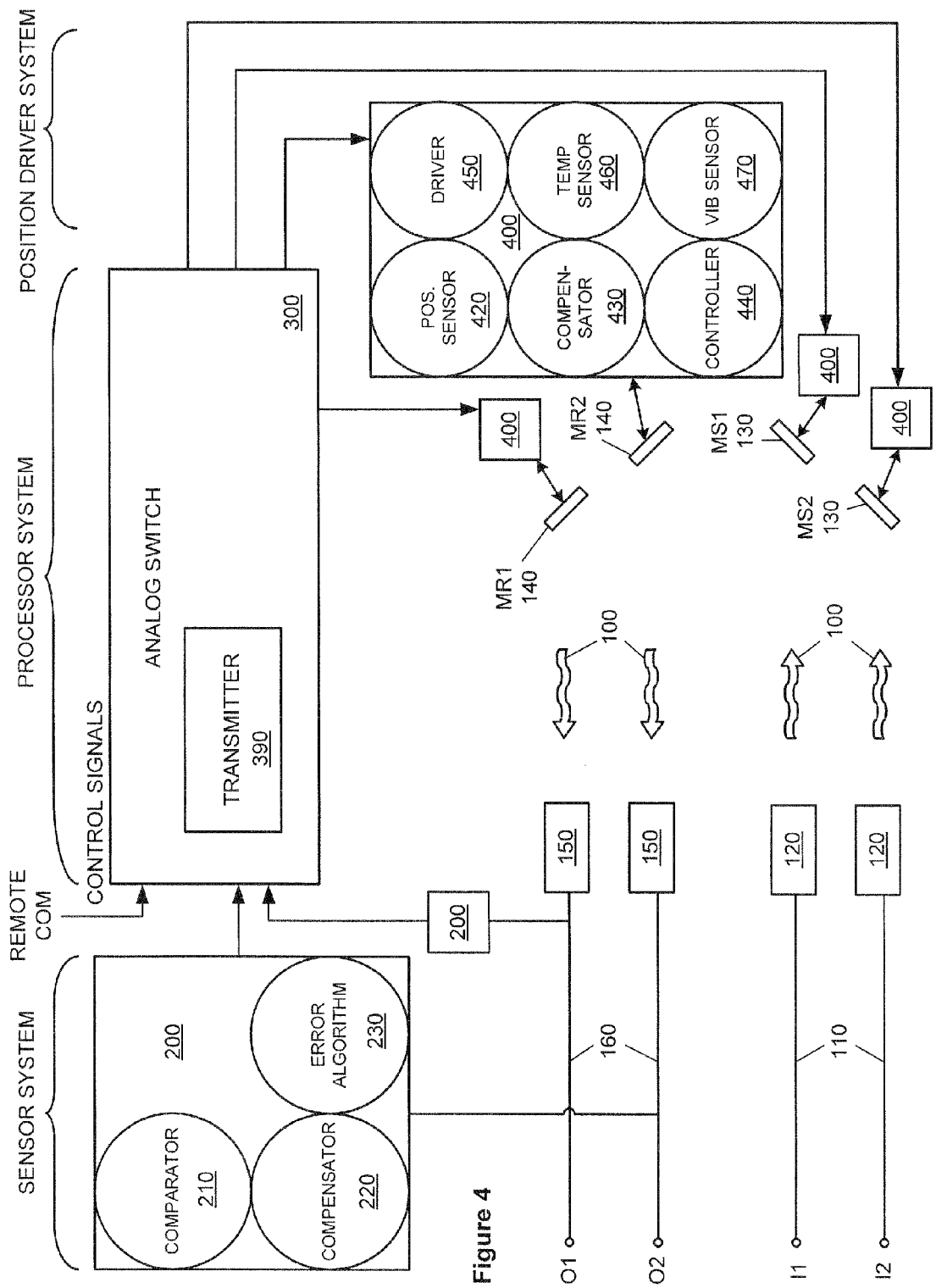
FIG. 4 is a block diagram illustrating a further embodiment of the present invention with an analog switch as a processor circuit.

FIG. 4 is a block diagram for showing one embodiment of the present invention with an analog switch 300 as a processor circuit in an open loop system. The components and system layout are similar to those in FIG. 2. However, in this embodiment of the invention, the sensor circuit 200 does not have an analog-to-digital signal converter and the position driver circuit 400 does not have a digital-to-analog signal converter. Further, the processor 300 can be an analog, digital or hybrid processor. In this case, the error signal generated by the sensor 200 will be sent directly through the analog switch or processor 300 to the sending or receiving mirror position driver 400. The error signal may be retransmitted by the transmitter 390 to both the sending mirror position driver 130 and the receiving position driver 140 for simultaneous control. However, no data manipulation is required at the analog switch or processor 300.

The position driver 400 is configured via hardware to receive the analog error signal and reposition the sending mirror 130 and/or the receiving mirror 140 accordingly to obtain maximum signal transfer across the optical switch. The data transmissions between the components are analog. Consequently, there will be some noise and electromagnetic interferences associated with the analog signals. However, since the signals are minimized because of the localized distributive control configuration, the error will also be minimized.

The processor 300 receives control signals from the remote communication line 500, which tell the processor when to switch, and from which input port to what output port.

Electrical Cross Connect

Figure 5:
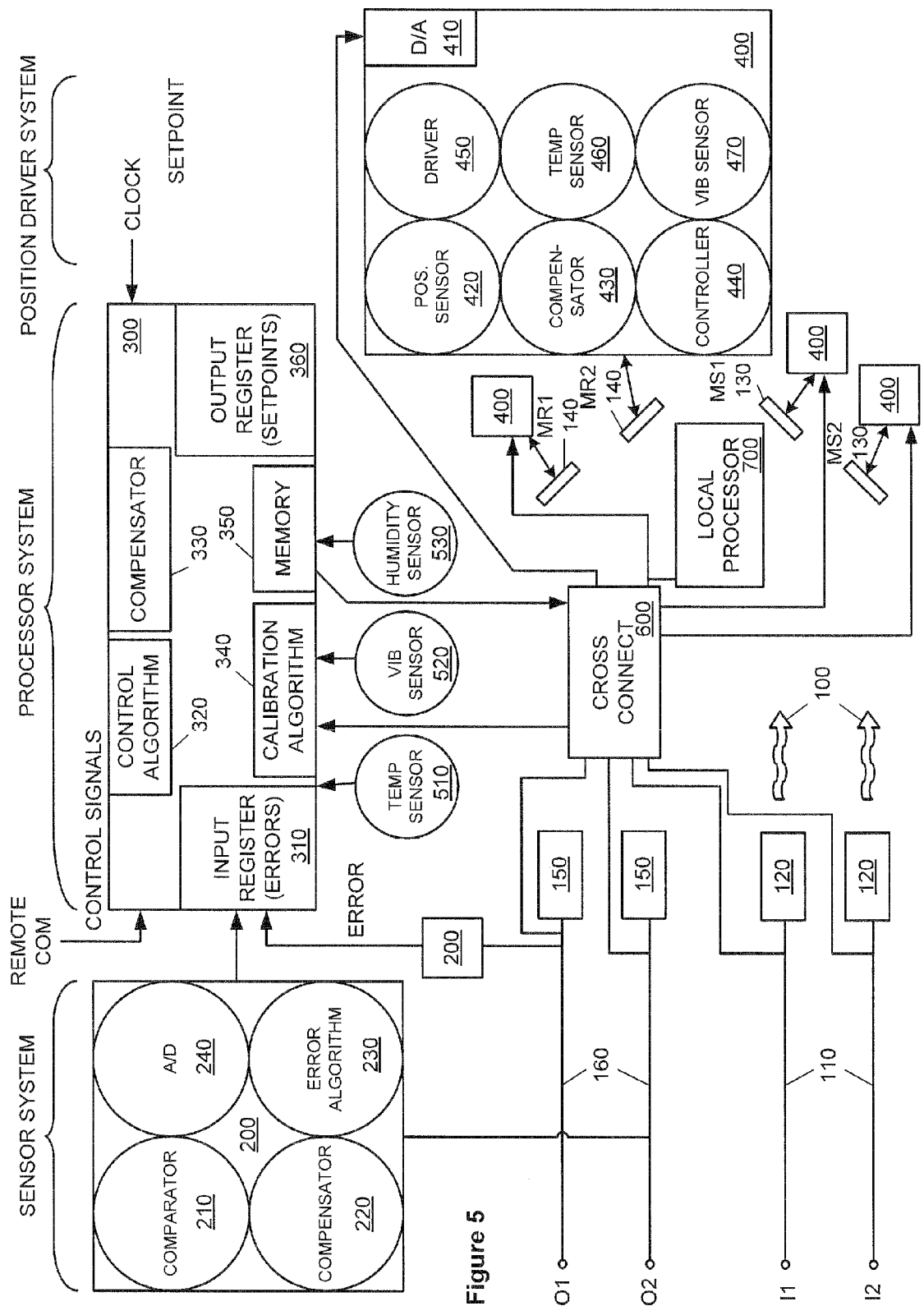
FIG. 5 is a block diagram for showing one embodiment of the present invention with the additional processor element of an electrical cross connect 600.

FIG. 5 is a block diagram for showing one embodiment of the present invention with the additional processor element of an electrical crossconnect 600. The components and system layout are similar to those in FIG. 2, however, in this embodiment of the invention, the processor 300 only manages top-level interconnections and maintenance, all of the high speed signal exchange between sensors 200 and position drivers 400 is handled by the cross connect 600. The electrical cross connect 600 and processor 300 maintain signal communication at all times. The processor 300 acts as the top level manager and coordinates which blocks will communicate and provide local computation whereas the cross connect 600 provides the fabric to interconnect these blocks. In this embodiment a significant benefit is that the processor 300 can monitor progress of any localized processing when it is desired for monitoring and troubleshooting, but is not required for normal operation. Therefore, tasks (or switch state commands in the present OXC example) are sent by the processor to the electrical cross connect, and the cross connect sends back information on task progress only to the level desired by the processor 300. Cross Connect 600 is either a digital or analog electrical cross connect chip, such as those which are readily available as off the shelf components well known in the telecommunications industry. Depending on the number of input and output (I/O) ports desired in the optical cross connect system, the electrical cross connect should have a corresponding number of I/O ports. Conversely, multiplexing (MUX) units (not shown) may be used in conjunction with electrical cross connects having less I/O ports than the system in which they operate. Groups of both sensor and position driver elements may be connected to a MUX unit, which is in turn singly connected to the electrical cross connect. Using an electrical cross connect with sufficient throughput bandwidth, the MUX may route signals to and from the sensor/position driver elements and the cross connect enabling signal transfer between all system elements. The manner in which MUX units may be connected to electronic chips is well known in the art, providing those skilled in the art the ability to utilize a wide variety of electronic cross connect chips depending on system requirements, desired functionality, or cost requirements. A localized processing unit 700 is placed in the signal path between electronic cross connect 600 and a set of desired position drivers elements 400 (such as those connected to Mr1 and Ms1 as shown in FIG. 5). A Digital Signal Processor (DSP) or other localized processing element may be used. In general it will be necessary to include local processor units for each set of input/output channels on the electronic cross connect such that for any given system state, local processing may be utilized to rapidly execute given command sets. These localized processing units function as further distributed control elements of the processor system, acting themselves as closed loop processors for a desired switch state as set by the electric cross connect. These local processing units can provide exceptionally fast computational power for very well defined and independent tasks, making them ideal for use in the Distributed Control System of the current invention. Overall processing power can scale quickly and easily with the limits of the cross connect 600 using DSP or other local processing chips. The centralized processor 300 would likely become pushed to the limits of its processing ability quickly if used exclusively in OXC's of increasing port count. Thus, the use of electronic cross connect units, DSP or other local processor chips, and optional MUX elements in a distributed control architecture as described in the present invention can significantly enhance control system performance and allow for quick and easy scaling of the optical switch port count without control system degradation.

The major advantages of this invention are rapid and precise control of the switching mirror, and thus improved performance of the light transmission network. Because the switching system of the present invention is more accurate and efficient than those of the prior arts, less energy is consumed and less heat is produced during operation. Further, the invention also increases the ability of the circuit to withstand higher thermal and mechanical stresses. Consequently, the reliability is increased with less damage from thermal degradation and less temperature variations, which aid in predicting the performance of the system. As a result of overall system improvement, the invention allows for more leeway with constricting design parameters and increases the options in the selection of enabling technology in the design of a fiber optic switch. The distributed control systems may be bulk fabricated to form separate optical switch units to be assembled in an array, or an integrated planar array of optical switch units on a same substrate to create a large multi-channel optical switch.

While the present invention is described herein with reference to particular applications, it should be understood that the invention is not limited hereto. It will be apparent to those skilled in the art that various modifications and improvements may be made without departing from the scope and spirit of the invention. For example, the inventive concepts herein may be applied to any forms of position control where the controller can be a field programmable gate array, digital signal processor, microprocessor, programmable logic controller, or any other electrical equipment with processing capability. It could be implemented as a hybridized module, which contains all the electronics necessary to perform the switching function. The location of the processor and any of the signals can be placed locally and/or remotely via a network. The output control signal can drive a MEMS position driver that has electrostatic or electromagnetic control, or any other motor that requires accurate position control. For optical switching, it can be used in a 2D (N2 architecture) planar array switch or a 3D (2N architecture) analog cross-connect switch. The electronics of the MEMS optical-switch components can be fabricated in the same hermetically sealed ceramic packages. Accordingly, it is to be understood that the invention is not to be limited by the specific illustrated embodiments, but only by the scope of the appended claims.

We claim:

1. A distributed feedback control system, comprising:
   a plurality of electromagnetic actuatable mirrors to reflect at least one optical signal from a system input to one of a plurality of a system outputs;
   a processor system to identify the system input that corresponds to the optical signal and to identify the system output corresponding to the optical signal reflected by the electromagnetic actuatable mirrors;
   a local controller to position the electromagnetic actuatable mirrors responsive to the identified system input and the identified system output, the electromagnetic actuatable mirrors to reflect the optical signal from the identified system input to the identified system output according to the position of the electromagnetic actuatable mirrors; and
   a plurality of sensors to detect the optical signal at the system input and the system output, and to determine a difference in the optical signal between the system input and the system output, the local controller to reposition the electromagnetic actuatable mirrors responsive to the determined difference in the optical signal between the system input and the system output, where the local controller to provide information corresponding to the reposition of the electromagnetic actuatable mirrors to the processor system.

2. A distributed feedback control system as in claim 1, wherein the actuatable mirrors comprise a first set of actuatable mirrors and a second set of actuatable mirrors, where the local controller actuates at least one actuatable mirror from the first set and at least one actuatable mirror from the second set substantially simultaneously responsive to the determined difference in the optical signal between the system input and the system output.

3. A distributed feedback control system as in claim 2, wherein the sensors comprise incoming sensors and outgoing sensors.

4. A distributed feedback control system as in claim 3, wherein the sensors comprise optical sensors such that, in the presence of incoming and outgoing optical signals, an optical power reading of both incoming and outgoing optical signals may be generated.

5. A distributed feedback control system as in claim 3, wherein the number of outgoing sensors equals the number of incoming sensors.

6. A distributive feedback control system as in claim 5, wherein the total number of sensors is equal to the total number of actuatable elements.

7. A distributive feedback control system as in claim 6, wherein each actuatable mirror from the first set is operatively connected to a corresponding incoming sensor, and each actuatable element from the second set is operatively connected to a corresponding outgoing sensor such that only functional pairs of actuatable mirrors and sensors exist in both first and second sets of actuatable mirrors.

8. A distributed feedback control system as in claim 1, wherein the actuatable mirrors comprise dual-axis MEMS based mirrored devices.

9. A distributed feedback control system as in claim 8, wherein the local controller comprises an application specific integrated circuit (ASIC) located in close physical proximity to the dual-axis MEMS based mirror device and electronically connected to said dual-axis MEMS based mirror to perform management, control, monitoring, and maintenance functions on the dual-axis MEMS based mirror.

10. A distributed feedback control system as in claim 1 further comprising at least one local processor to receive control signals from a main processor and from at least one local controller, to generate local processor signals which are sent to the main processor, and to generate local command signals which are sent to at least one local controller.

11. A distributed feedback control system as in claim 10, wherein the local processor comprises a digital signal processor (DSP).

12. A distributed feedback control system as in claim 1, further comprising an electronic cross connect element to route control error signals from functional sensor/actuatable mirror pairs through the electronic cross connect directly to local processors such that the main processor need not perform signal routing functions from the functional sensor/actuatable mirror pairs to the local controllers.

13. A distributed feedback control system as in claim 12, wherein the electronic cross connect comprises a cross connect having an equal number of channels as the number of actuatable mirrors.

14. A distributed feedback control system as in claim 12, wherein the electronic cross connect comprises a cross connect having a lesser number of channels as the number of actuatable mirrors and at least one multiplexing element for connecting two or more local controllers to a single channel of the electronic cross connect.

15. The distributed feedback control system of claim 1 where the processor system directs the local controller to reposition the electromagnetic actuatable mirrors responsive to the determined difference in optical signal between the system input and the system output from the sensors and at least noise, temperature, humidity, or vibration associated with the distributed feedback control system.

16. The distributed feedback control system of claim 1 where the sensors iteratively detect the optical signal at the system input and the system output to determine the differences in optical signal over time, and the local controller iteratively reposition the electromagnetic actuatable mirrors responsive to the determined differences in the optical signal between the system input and the system output.

17. The distributed feedback control system of claim 1 where the sensors compare the determined difference in the optical signal to a predetermined acceptable range of tolerances, and the local controller does not reposition the mirrors when the optical signal is within the predetermined acceptable range of tolerances.

18. A distributed feedback control system, comprising:
a plurality of electromagnetic controllable mirrors, each controllable to affect passage of an optical signal to a system output;
a local controller associated with each controllable mirror, the local controller to control the associated controllable mirror to reflect the optical signal from a system input to the system output;
an error determination module to detect the optical signal at the system output, and to compare the detected optical signal at the system output with a preset intensity level, the local controller to reposition the controllable mirrors when the comparison indicates that the optical signal at the system output is lower than the preset intensity level.

19. The distributed feedback control system as in claim 18, including a processor system to direct the local controller to reposition the controllable mirrors responsive to the determination that the optical signal at the system output is lower than the predetermined intensity and at least noise, temperature, humidity, or vibration associated with the distributed feedback control system.

20. The distributed feedback control system as in claim 18,
where the local controller is configured to provide reposition information corresponding to the reposition of the controllable mirrors to the error detection module; and
where the error determination module redetects the optical signal at the system output, compares the redetected optical signal to the predetermined expected intensity level, and the local controller iteratively repositions the controllable mirrors responsive to the comparison and the reposition information.

21. A method comprising:
identifying an input port to receive an optical signal and an output port to route the optical signal;
electromagnetically controlling multiple controllable mirrors to route the optical signal from the input port to the output port;
determining a deviation of the optical signal detected at the output port from the optical signal detected at the input port; and
repositioning the multiple controllable mirrors that route the optical signal from the input port to the output port responsive to the determining.

22. The method of claim 21 includes repositioning the controllable mirrors responsive to the determined deviation in optical signal between the input port and the output port and at least noise, temperature, humidity, or vibration.

23. The method of claim 21 includes
iteratively detecting the optical signal at the input port and the output port to determine the deviation in optical signal over time,
iteratively repositioning the controllable mirrors responsive to the deviations in the optical signal between the input port and the output port.

24. The method of claim 21 includes
comparing the determined deviation in the optical signal to a predetermined acceptable range of tolerances; and
determining to not reposition the mirrors when the optical signal is within the predetermined acceptable range of tolerances.

* * * * *

UNITED STATES PATENT AND TRADEMARK OFFICE
CERTIFICATE OF CORRECTION

PATENT NO. : 7,437,071 B2  
APPLICATION NO. : 10/102142  
DATED : October 14, 2008  
INVENTOR(S) : Bhat et al.

Page 1 of 1

It is certified that error appears in the above-identified patent and that said Letters Patent is hereby corrected as shown below:

Title Page: item (63);
Please include the following under Related U.S. Application Data:

Provisional application No. 60/277,046, filed on March 18, 2001.
Provisional application No. 60/277,049, filed on March 18, 2001.
Provisional application No. 60/277,057, filed on March 18, 2001.

Signed and Sealed this

Eighth Day of December, 2009

David J. Kappos
*Director of the United States Patent and Trademark Office*